United States Patent
Dixon et al.

(10) Patent No.: US 9,467,284 B2
(45) Date of Patent: Oct. 11, 2016

(54) TRANSMITTER, RECEIVER, QUANTUM KEY DISTRIBUTION (QKD) SYSTEM AND QUANTUM KEY DISTRIBUTION METHOD

(71) Applicant: KABUSHIKI KAISHA TOSHIBA, Minato-ku (JP)

(72) Inventors: Alex Dixon, Kawasaki (JP); Yoshimichi Tanizawa, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/333,878

(22) Filed: Jul. 17, 2014

(65) Prior Publication Data

US 2015/0036824 A1 Feb. 5, 2015

(30) Foreign Application Priority Data

Jul. 31, 2013 (JP) .................................. 2013-158864

(51) Int. Cl.
    *G06F 11/16* (2006.01)
    *H04L 9/08* (2006.01)
    *H04K 1/02* (2006.01)

(52) U.S. Cl.
    CPC .................................. *H04L 9/0852* (2013.01)

(58) Field of Classification Search
    CPC .................... H04B 10/6165; H04B 10/70
    See application file for complete search history.

(56) References Cited

U.S. PATENT DOCUMENTS

| | | | | |
|---|---|---|---|---|
| 5,768,378 A | * | 6/1998 | Townsend | ........... G02F 1/13471 380/256 |
| 8,934,633 B2 | * | 1/2015 | Tomaru | ..................... H04L 9/08 340/5.26 |
| 2005/0157875 A1 | * | 7/2005 | Nishioka | ............... H04L 9/0858 380/46 |
| 2006/0093143 A1 | * | 5/2006 | Maeda | ................... H04L 9/0852 380/256 |
| 2011/0311050 A1 | * | 12/2011 | Tomaru | .................. H04B 10/70 380/256 |
| 2012/0177201 A1 | * | 7/2012 | Ayling | .................. H04L 9/0858 380/278 |
| 2014/0095957 A1 | | 4/2014 | Dixon et al. | |

FOREIGN PATENT DOCUMENTS

JP    EP 1755269 A1 *  2/2007  ............. H04B 10/70
JP    2014-72842       4/2014

OTHER PUBLICATIONS

Efficient Quantum Key Distribution Scheme and a Proof of Its Unconditional Security. Lo et al. Journal of Cryptology(2004).*

(Continued)

*Primary Examiner* — Venkat Perungavoor
(74) *Attorney, Agent, or Firm* — Oblon, McClelland, Maier & Neustadt, L.L.P

(57) ABSTRACT

According to an embodiment, a transmitter transmits first transmission key data and second transmission key data as quantum information. The transmitter includes a first privacy amplifier and a second privacy amplifier. The first privacy amplifier generates first secure key data by performing privacy amplification to remove information that has possibly been acquired by an eavesdropper of the first transmission key data on the first transmission key data. The second privacy amplifier generates second secure key data by performing the privacy amplification to remove information that has possibly been acquired by the eavesdropper of the second reception key data on the decoded key data.

5 Claims, 4 Drawing Sheets

(56) References Cited

OTHER PUBLICATIONS

Pratical Error-Correction Procedures in Quantum Cryptography. Makkaveev et al. Journal of Experimental and Theoretical Physics( 2005).*
J.-C. Boileau, et al., "Higher-security thresholds for quantum key distribution by improved analysis of dark counts". Physical Review A, vol. 72, 2005, pp. 032321-1-032321-6.
Charles H. Bennett, et al., "Quantum Cryptography : Public Key Distribution and Coin Tossing", International Conference on Computers, Systems & Signal Processing, Dec. 10-12, 1984, 5 pages.
Charles H. Bennett, et al., "Generalized Privacy Amplification", IEEE Transactions on Information Theory, vol. 41, No. 6, Nov. 1995, pp. 1915-1923.
Masahito Hayashi, "General theory for decoy-state quantum key distribution with an arbitrary number of intensities", New Journal of Physics, vol. 9, No. 8, Aug. 24, 2007, 27 pages.

* cited by examiner

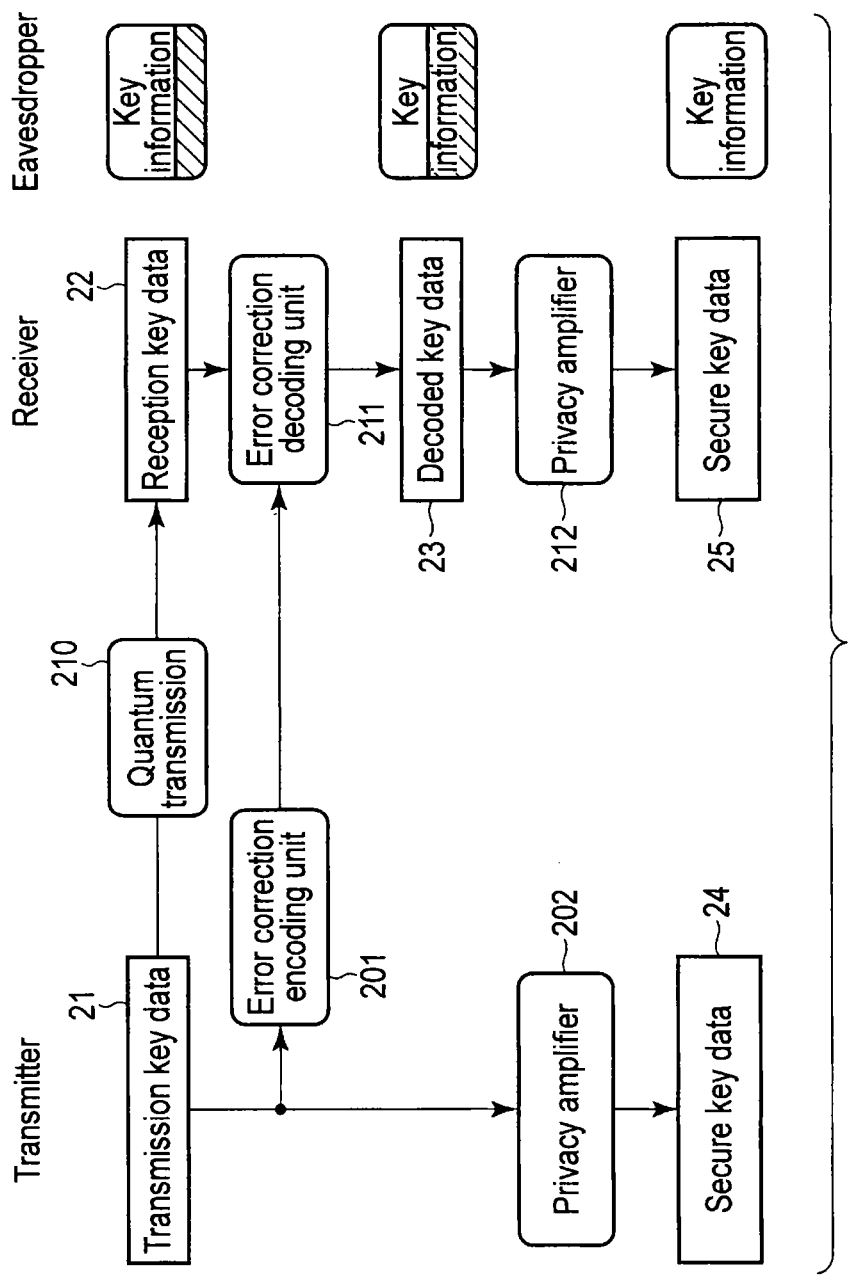
F I G. 2

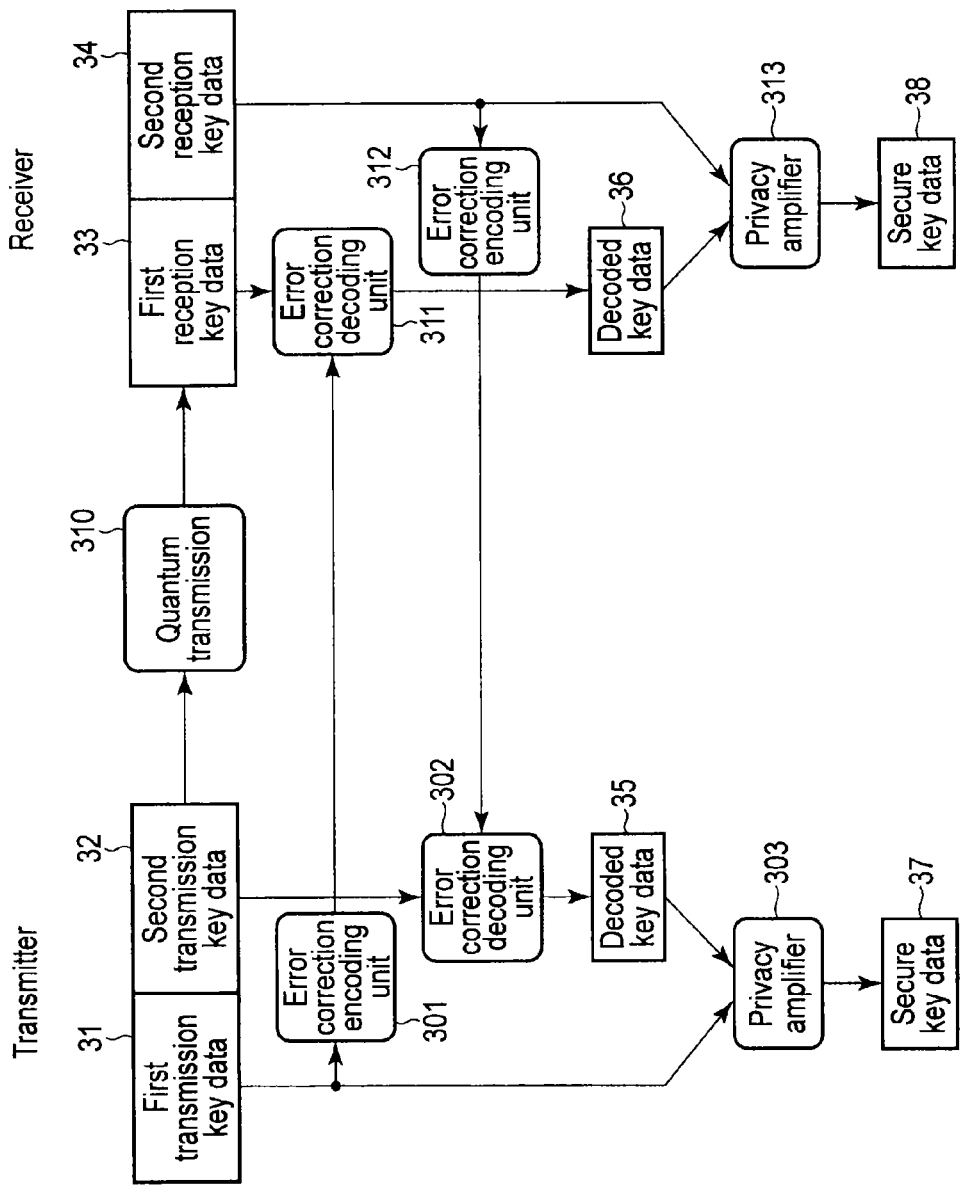
F I G. 3

TRANSMITTER, RECEIVER, QUANTUM KEY DISTRIBUTION (QKD) SYSTEM AND QUANTUM KEY DISTRIBUTION METHOD

CROSS-REFERENCE TO RELATED APPLICATIONS

This application is based upon and claims the benefit of priority from Japanese Patent Application No. 2013-158864, filed Jul. 31, 2013, the entire contents of which are incorporated herein by reference.

FIELD

Embodiments described herein relate generally to privacy amplification (PA) in quantum key distribution.

BACKGROUND

Quantum key distribution is a technique that generates random and secure private digital data between two parties or among three or more parties. The digital data is called key data. Key data can be used for encryption in communication performed between the parties. The parties normally mean transmitters or receivers.

According to quantum key distribution, key data is transmitted from a transmitter to a receiver as quantum information. Thus, the maximum amount of information that may be acquired by a third party eavesdropper as key data can be estimated based on quantum theory. However, this estimation assumes that the transmission source of key data is identified.

Some errors arise in transmission of quantum information. That is, key data received by a receiver does not perfectly match key data transmitted by a transmitter. Thus, it becomes necessary to correct any errors contained in key data before the key data is used between parties. An error may be caused by noise in a transmission channel or by the interception of key data by an eavesdropper.

Errors contained in key data are typically corrected by using a technique called the forward error correction. According to the forward error correction, a receiver corrects errors contained in reception key data so that the reception key data matches transmission key data. Therefore, when the forward error correction is applied, final secure key data matches transmission key data.

On the other hand, a technique called the backward error correction is also known. In the backward error correction, a difference of transmission key data from reception key data is handled as an error. That is, according to the backward error correction, a transmitter corrects errors contained in transmission key data so that the transmission key data matches reception key data. Therefore, when the backward error correction is applied, final secure key data matches reception key data.

In quantum key distribution, processing called privacy amplification is provided after error correction. Information that may be acquired by an eavesdropper of key data shared among normal parties is removed by privacy amplification. More specifically, normal parties discard some amount of key data and also remove information that may be acquired by an eavesdropper by reducing the size of the key data using a hash algorithm.

BRIEF DESCRIPTION OF THE DRAWINGS

FIG. 2 is a block diagram showing a quantum key distribution system according to Comparative Example 1;

FIG. 3 is a block diagram showing a quantum key distribution system according to Comparative Example 2.

DETAILED DESCRIPTION

Figure 1:
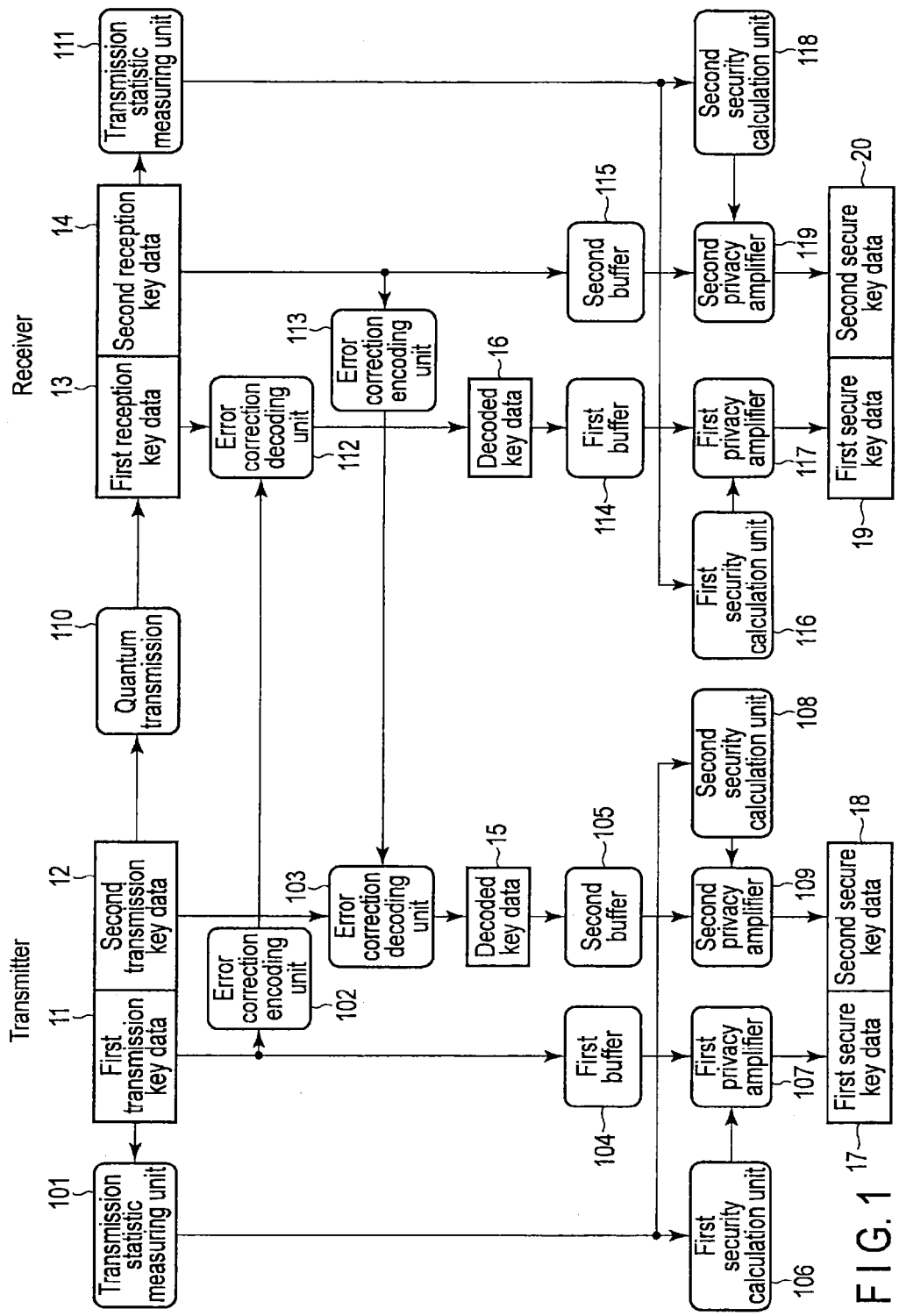
FIG. 1 is a block diagram illustrating a quantum key distribution system according to a first embodiment.

An embodiment will be described below with reference to the drawings.

According to an embodiment, a transmitter transmits first transmission key data and second transmission key data as quantum information. The transmitter includes an error correction encoding unit, an error correction decoding unit, a first privacy amplifier and a second privacy amplifier. The error correction encoding unit generates first additional information by performing error correction encoding of the first transmission key data. The error correction decoding unit generates decoded key data by correcting errors contained in the second transmission key data using second additional information generated based on second reception key data corresponding to the second transmission key data. The first privacy amplifier generates first secure key data by performing privacy amplification to remove information that has possibly been acquired by an eavesdropper of the first transmission key data on the first transmission key data. The second privacy amplifier generates second secure key data by performing the privacy amplification to remove information that has possibly been acquired by the eavesdropper of the second reception key data on the decoded key data.

According to another embodiment, a receiver obtains first reception key data and second reception key data corresponding to first transmission key data and second transmission key data by receiving quantum information. The error correction encoding unit generates second additional information by performing error correction encoding of the second reception key data. The error correction decoding unit generates decoded key data by correcting errors contained in the first reception key data using first additional information generated based on the first transmission key data. The first privacy amplifier generates first secure key data by performing privacy amplification to remove information that has possibly been acquired by an eavesdropper of the first transmission key data on the decoded key data. The second privacy amplifier generates second secure key data by performing the privacy amplification to remove information that has possibly been acquired by the eavesdropper of the second reception key data on the second reception key data.

Hereinafter, the same or similar reference numerals are attached to the same or similar elements that have been described and a duplicate description is basically omitted.

First Embodiment

A standard quantum key distribution system (hereinafter, also called a quantum key distribution system according to Comparative Example 1) is illustrated in FIG. 2. In FIG. 2, in addition to normal communication parties (that is, a transmitter and a receiver), a third party (that is, an eavesdropper) is drawn. The eavesdropper tries to acquire information about key data transmitted between normal communication parties.

The transmitter in FIG. 2 includes an error correction encoding unit 201 and a privacy amplifier 202. The receiver
} in FIG. 2 includes an error correction decoding unit 211 and a privacy amplifier 212. Quantum transmission 210 in FIG. 2 includes a quantum communication channel to carry quantum information as key data. The quantum transmission 210 may further include hardware of the transmitter related to transmission of quantum information or hardware of the receiver related to reception of quantum information. In FIG. 2, the amount of key information that may be acquired by the eavesdropper is stepwise drawn. The amount of relevant key information is represented by the height of a diagonally shaded area. In FIGS. 1 to 4, it is assumed that a rectangular block represents data and a rounded rectangular block represents a functional unit.

The transmitter transmits quantum information as transmission key data 21 to the receiver. The eavesdropper may intercept the transmission of quantum information. The receiver acquires reception key data 22 by receiving quantum information. The reception key data 22 normally does not match the transmission key data 21 because some errors may be contained. Such errors correspond to a difference of the reception key data 22 from the transmission key data 21. An error is caused not only by noise, but also by eavesdropping. Because, as described above, key data is transmitted as quantum information, information intercepted by an eavesdropper entails an error. Thus, as long as an error rate is non-zero, it is necessary to assume that an eavesdropper has acquired a certain amount of key information.

When the transmission of key data ends, the transmitter and receiver make error corrections. As shown in FIG. 2, the forward error correction is applied to the quantum key distribution system according to Comparative Example 1. More specifically, the transmission key data 21 is input into the error correction encoding unit 201 and the reception key data 22 is input into the error correction decoding unit 211

The error correction encoding unit 201 generates additional information (for example, parity check information) to correct errors generated in the transmission key data 21. Incidentally, the error correcting code that can be used by the error correction encoding unit 201 and the error correction decoding unit 211 is not specifically limited, but the error correcting code with a decreasing size of additional information compared with the size of the transmission key data 21 can be evaluated as a better error correcting code. The transmitter transmits the additional information to the receiver. Normally, the additional information is carried on a communication channel (that can be assumed that no error is caused) different from the communication channel of the transmission key data 21.

The additional information received by the receiver is input into the error correction decoding unit 211. The error correction decoding unit 211 generates decoded key data 23 by correcting errors (that is, a difference from the transmission key data 21) contained in the reception key data 22 using the additional information. The decoded key data 23 matches the transmission key data 21. Theoretically, additional information may also be intercepted by an eavesdropper. Thus, the amount of key information that may have been acquired by an eavesdropper further increases in the stage of error correction.

The transmitter and receiver performs privacy amplification to share secure (that is, ideally, totally unknown to an eavesdropper) key data in the end. In the privacy amplification, a hash function is used to derive final key data (that is, secure key data 24 or secure key data 25) having a smaller size from the whole initial key data (that is, the transmission key data 21 or the decoded key data 23). More specifically, the privacy amplifier 202 generates the secure key data 24 by performing privacy amplification on the transmission key data 21. The privacy amplifier 212 generates the secure key data 25 by performing privacy amplification on the decoded key data 23.

If the hash function is selected suitably and the size of final key data is sufficiently small, it can be guaranteed with very high reliability that an eavesdropper has no information about the final key data at all. In other words, the probability of an eavesdropper having some kind of information about the final key data is lower than a predetermined value. Prior to the privacy amplification, the size of the final key data to provide the guarantee is calculated. In the calculation, an upper estimated value may be assumed as the amount of key information that may have been acquired by an eavesdropper. The upper estimated value can be calculated based on quantum theory and information theory. However, the calculation of the upper estimated value assumes that the transmission source of key data is identified. While the transmission source of key data is a transmitter in Comparative Example 1, the transmission source of key data in a quantum key distribution system to which the backward error correction is applied is a receiver.

The above forward error correction and backward error correction are typically applied alone. However, both may be combined for application. If the forward error correction and backward error correction should be combined and applied to a quantum key distribution system, final secure key data will match neither transmission key data nor reception key data and will match a combination of the transmission key data and reception key data.

A quantum key distribution system (hereinafter, also called a quantum key distribution system according to Comparative Example 2) to which the forward error correction and backward error correction are combined and applied is illustrated in FIG. 3. The transmitter in FIG. 3 includes an error correction encoding unit 301, an error correction decoding unit 302, and a privacy amplifier 303. The receiver in FIG. 3 includes an error correction decoding unit 311, an error correction encoding unit 312, and a privacy amplifier 313. Quantum transmission 310 in FIG. 3 includes a quantum communication channel to carry quantum information as key data. The quantum transmission 310 may further include hardware of the transmitter related to transmission of quantum information or hardware of the receiver related to reception of quantum information.

The transmitter transmits quantum information as first transmission key data 31 and second transmission key data 32 to the receiver. Like in FIG. 2, the eavesdropper may intercept the transmission of quantum information. Here, the first transmission key data 31 and the second transmission key data 32 each correspond to key data obtained by dividing the transmission key data 21 in FIG. 2 into two. The first transmission key data 31 and the second transmission key data 32 may have the same data size or different data sizes.

The receiver acquires first reception key data 33 and second reception key data 34 by receiving quantum information. The first reception key data 33 corresponds to the first transmission key data 31 and the second reception key data 34 corresponds to the second transmission key data 32. The first reception key data 33 and the second reception key data 34 normally contain some errors and so may not match the first transmission key data 31 and the second transmission key data 32 respectively.

The first transmission key data 31 and the first reception key data 33 are used for forward error correction. The second transmission key data 32 and the second reception key data 34 are used for backward error correction.

When the transmission of key data ends, the transmitter and receiver make error corrections. As described above, both of the forward error correction and backward error correction are applied to the quantum key distribution system according to Comparative Example 2.

More specifically, for the forward error correction, the first transmission key data 31 is input into the error correction encoding unit 301 and the first reception key data 33 is input into the error correction decoding unit 311. The error correction encoding unit 301 generates additional information (for example, parity check information) to correct errors generated in the first transmission key data 31.

Incidentally, the error correcting code that can be used by the error correction encoding unit 301 and the error correction decoding unit 311 is not specifically limited, but the error correcting code with a decreasing size of additional information compared with the size of the first transmission key data 31 can be evaluated as a better error correcting code.

The transmitter transmits the additional information to the receiver. Normally, the additional information is carried on a communication channel (that can be assumed that no error is caused) different from the communication channel of the first transmission key data 31 and the second transmission key data 32. The additional information received by the receiver is input into the error correction decoding unit 311. The error correction decoding unit 311 generates decoded key data 36 by correcting errors (that is, a difference from the first transmission key data 31) contained in the first reception key data 33 using the additional information. The decoded key data 36 matches the first transmission key data 31.

For the backward error correction, the second reception key data 34 is input into the error correction encoding unit 312 and the second transmission key data 32 is input into the error correction decoding unit 302. The error correction encoding unit 312 generates additional information (for example, parity check information) to correct errors generated in the second reception key data 34.

Incidentally, the error correcting code that can be used by the error correction encoding unit 312 and the error correction decoding unit 302 is not specifically limited, but the error correcting code with a decreasing size of additional information compared with the size of the second reception key data 34 can be evaluated as a better error correcting code.

The receiver transmits the additional information to the transmitter. Normally, the additional information is carried on a communication channel (that can be assumed that no error is caused) different from the communication channel of the first transmission key data 31 and the second transmission key data 32. The additional information received by the transmitter is input into the error correction decoding unit 302. The error correction decoding unit 302 generates decoded key data 35 by correcting errors (that is, a difference from the second reception key data 34) contained in the second transmission key data 32 using the additional information. The decoded key data 35 matches the second reception key data 34.

After the forward error correction and the backward error correction end, the transmitter and receiver can share the same key data. The key data corresponds to combined data of the first transmission key data 31 (this matches the decoded key data 36) and the second reception key data 34 (this matches the decoded key data 35). However, an eavesdropper may have acquired some amount of information about the key data. Therefore, the transmitter and receiver perform privacy amplification to share secure (that is, ideally, totally unknown to an eavesdropper) key data in the end.

In the privacy amplification, a hash function is used to derive final key data (that is, secure key data 37 or secure key data 38) having a smaller size from initial key data (that is, the first transmission key data 31 and the decoded key data 35, or the decoded key data 36 and the second reception key data 34). More specifically, the privacy amplifier 303 generates the secure key data 37 by performing privacy amplification on combined data of the first transmission key data 31 and the decoded key data 35. The privacy amplifier 313 generates the secure key data 38 by performing privacy amplification on combined data of the decoded key data 36 and the second reception key data 34.

When the above forward error correction or backward error correction is applied alone, a technique to correctly estimate the amount of information that may be acquired by an eavesdropper of key data (for example, the transmission key data 21 or the decoded key data 23 in FIG. 2) is known. Therefore, security (that is, the probability that an eavesdropper has some kind of information about final key data is very low) is guaranteed by privacy amplification shown in Comparative Example 1.

On the other hand, the forward error correction and backward error correction are combined for application, no technique to correctly estimate the amount of information that may be acquired by an eavesdropper of key data (for example, combined data of the first transmission key data 31 and the decoded key data 35 or combined data of the decoded key data 36 and the second reception key data 34 in FIG. 3) is known. Therefore, whether security is guaranteed by privacy amplification shown in Comparative Example 2 is not clear.

When the forward error correction and backward error correction are combined for application, the transmission source is different from subset to subset of key data. More specifically, the transmission source of a subset related to the forward error correction is a transmitter and the transmission source of a subset related to the backward error correction is a receiver. Therefore, to guarantee security in this case, handling key information acquired by an eavesdropper depending on which subset of key data the acquired key information relates to is considered to be necessary.

A quantum key distribution system according to the first embodiment is illustrated in FIG. 1. Both of the forward error correction and backward error correction are applied to the quantum key distribution system according to the present embodiment.

The transmitter in FIG. 1 includes a transmission statistic measuring unit 101, an error correction encoding unit 102, an error correction decoding unit 103, a first buffer 104, a second buffer 105, a first security calculation unit 106, a first privacy amplifier 107, a second security calculation unit 108, and a second privacy amplifier 109.

The receiver in FIG. 1 includes a transmission statistic measuring unit 111, an error correction decoding unit 112, an error correction encoding unit 113, a first buffer 114, a second buffer 115, a first security calculation unit 116, a first privacy amplifier 117, a second security calculation unit 118, and a second privacy amplifier 119.

Quantum transmission 110 in FIG. 1 includes a quantum communication channel to carry quantum information as key data. The quantum transmission 110 may further include hardware of the transmitter related to transmission of quantum information or hardware of the receiver related to reception of quantum information.

The transmitter transmits quantum information as first transmission key data 11 and second transmission key data 12 to the receiver. Like in FIGS. 2 and 3, the eavesdropper may intercept the transmission of quantum information. Here, the first transmission key data 11 and the second transmission key data 12 correspond to the first transmission key data 31 and the second transmission key data 32 described above respectively.

The receiver acquires first reception key data 13 and second reception key data 14 by receiving quantum information. The first reception key data 13 and the second reception key data 14 correspond to the first reception key data 33 and the second reception key data 34 described above respectively.

When the transmission of key data ends, the transmitter and receiver make error corrections. As described above, both of the forward error correction and backward error correction are applied to the quantum key distribution system according to the present embodiment.

More specifically, for the forward error correction, the first transmission key data 11 is input into the error correction encoding unit 102 and the first reception key data 13 is input into the error correction decoding unit 112. The error correction encoding unit 102 generates additional information (for example, parity check information) to correct errors generated in the first transmission key data.

Incidentally, the error correcting code that can be used by the error correction encoding unit 102 and the error correction decoding unit 112 is not specifically limited, but the error correcting code with a decreasing size of additional information compared with the size of the first transmission key data 11 can be evaluated as a better error correcting code.

The transmitter transmits the additional information to the receiver. Normally, the additional information is carried on a communication channel (that can be assumed that no error is caused) different from the communication channel of the first transmission key data 11 and the second transmission key data 12. The additional information received by the receiver is input into the error correction decoding unit 112. The error correction decoding unit 112 generates decoded key data 16 by correcting errors (that is, a difference from the first transmission key data 11) contained in the first reception key data 13 using the additional information. The decoded key data 16 matches the first transmission key data 11.

For the backward error correction, the second reception key data 14 is input into the error correction encoding unit 113 and the second transmission key data 12 is input into the error correction decoding unit 103. The error correction encoding unit 113 generates additional information (for example, parity check information) to correct errors generated in the second reception key data 14.

Incidentally, the error correcting code that can be used by the error correction encoding unit 113 and the error correction decoding unit 103 is not specifically limited, but the error correcting code with a decreasing size of additional information compared with the size of the second reception key data 14 can be evaluated as a better error correcting code.

The receiver transmits the additional information to the transmitter. Normally, the additional information is carried on a communication channel (that can be assumed that no error is caused) different from the communication channel of the first transmission key data 11 and the second transmission key data 12. The additional information received by the transmitter is input into the error correction decoding unit 103. The error correction decoding unit 103 generates decoded key data 15 by correcting errors (that is, a difference from the second reception key data 14) contained in the second transmission key data 12 using the additional information. The decoded key data 15 matches the second reception key data 14.

After the forward error correction and the backward error correction end, the transmitter and receiver perform privacy amplification. The quantum key distribution system according to the present embodiment is different from Comparative Example 2 in privacy amplification. More specifically, the quantum key distribution system according to the present embodiment perform privacy amplification by distinguishing key data related to the forward error correction (that is, the first transmission key data 11 and the decoded key data 16 having a transmitter as the transmission source) and key data related to the backward error correction (that is, the second reception key data 14 and the decoded key data 15 having a receiver as the transmission source).

The transmission statistic measuring unit 101 measures a first transmission statistic related to quantum transmission of the first transmission key data 11 and a second transmission statistic related to quantum transmission of the second transmission key data 12. The transmission statistic is, for example, the error rate, bit rate and the like. Similarly, the transmission statistic measuring unit 111 measures a first transmission statistic related to quantum transmission of the first reception key data 13 and a second transmission statistic related to quantum transmission of the second reception key data 14.

The first transmission statistic from the transmission statistic measuring unit 101 is input into the first security calculation unit 106. The first security calculation unit 106 calculates a first security parameter based on the first transmission statistic. The first security parameter indicates the sizes of final key data (that is, first secure key data 17 and first secure key data 19) generated by privacy amplification to remove information that may have been acquired by an eavesdropper of the first transmission key data 11 (in other words, the decoded key data 16).

The first security calculation unit 106 may calculate the first security parameter according to, for example, Equation (1) below. Equation (1) is disclosed as Equation (5) in Non-Patent Literature 4.

$$S_a = p_c^{sq} + p_c \omega_0 - p_c H(e_x) - p_c^{sq} H(e_z^{sq} | e_x) \qquad (1)$$

In Equation (1), $S_a$ represents the first security parameter, $p_c^{sq}$ represents the detection rate of only single-photon pulses, $p_c$ represents the total detection rate of photons by the receiver, and $\omega_0$ represents the ratio of empty (vacuum) pulses transmitted by the transmitter. H(x) represents a function that returns binary Shannon entropy of x, $e_x$ represents the total bit error rate, and $e_x^{sq}$ represents the single-photon phase error rate.

The first transmission key data 11 is input into the first buffer 104 and stored therein. The first transmission key data 11 of the predetermined size stored in the first buffer 104 and the first security parameter from the first security calculation unit 106 are input into the first privacy amplifier 107. The first privacy amplifier 107 generates the first secure key data 17 by performing privacy amplification on the first transmission key data 11 using the first security parameter.

The second transmission statistic from the transmission statistic measuring unit 101 is input into the second security calculation unit 108. The second security calculation unit 108 calculates a second security parameter based on the second transmission statistic. The second security parameter indicates the sizes of final key data (that is, second secure key data 18 and second secure key data 20) generated by privacy amplification to remove information that may have been acquired by an eavesdropper of the second transmission key data 14 (in other words, the decoded key data 15).

The second security calculation unit 108 may calculate the second security parameter according to, for example, Equation (2) below. Equation (2) is disclosed as Equation (4) in Non-Patent Literature 4.

$$S_b = p_c^{sq} + p_c^{dk} - p_c H(e_x) - p_c^{sq} H(e_z^{sq} | e_x) \qquad (2)$$

In Equation (2), $S_b$ represents the second security parameter and $p_c^{dx}$ represents the detection rate of only dark counting. The meanings of other symbols in Equation (2) are the same as those in Equation (1).

The decoded key data 15 is input into the second buffer 105 and stored therein. The decoded key data 15 of the predetermined size stored in the second buffer 105 and the second security parameter from the second security calculation unit 108 are input into the second privacy amplifier 109. The second privacy amplifier 109 generates the second secure key data 18 by performing privacy amplification on the decoded key data 15 using the second security parameter.

As will be described below, the receiver side includes a functional unit corresponding to that on the transmitter side.

The first transmission statistic from the transmission statistic measuring unit 111 is input into the first security calculation unit 116. The first security calculation unit 116 calculates a first security parameter based on the first transmission statistic. The first security calculation unit 116 may perform the same processing or similar processing to that of the first security calculation unit 106 to calculate the first security parameter.

The decoded key data 16 is input into the first buffer 114 and stored therein. The decoded key data 16 of the predetermined size stored in the first buffer 114 and the first security parameter from the first security calculation unit 116 are input into the first privacy amplifier 117. The first privacy amplifier 117 generates the first secure key data 19 by performing privacy amplification on the decoded key data 16 using the first security parameter.

The second transmission statistic from the transmission statistic measuring unit 111 is input into the second security calculation unit 118. The second security calculation unit 118 calculates a second security parameter based on the second transmission statistic. The second security calculation unit 118 may perform the same processing or similar processing to that of the second security calculation unit 108 to calculate the second security parameter.

The second reception key data 14 is input into the second buffer 115 and stored therein. The second reception key data 14 of the predetermined size stored in the second buffer 115 and the second security parameter from the second security calculation unit 118 are input into the second privacy amplifier 119. The second privacy amplifier 119 generates the second secure key data 20 by performing privacy amplification on the second reception key data 14 using the second security parameter.

The first privacy amplifier 107, the second privacy amplifier 109, the first privacy amplifier 117, and the second privacy amplifier 119 all perform privacy amplification on key data from a single transmission source. Therefore, security of the first secure key data 17, the second secure key data 18, the first secure key data 19, and the second secure key data 20 can be guaranteed.

After the privacy amplification ends, the transmitter and receiver can share the same key data. The key data corresponds to combined data of the first secure key data 17 (this matches the first secure key data 19) and the second secure key data 18 (this matches the second secure key data 20). Security of a subset related to the forward error correction of the combined data is guaranteed by privacy amplification using the above first security parameter and security of a subset related to the backward error correction of the combined data is guaranteed by privacy amplification using the above second security parameter. Therefore, the secure key data can be used for encryption in communication between a transmitter and a receiver like normal circumstances.

Further, in the quantum key distribution system according to the present embodiment, the transmitter and receiver can access a subset of final secure key data at an early stage. Generally, computational complexity of error correction decoding is larger than that of error correction encoding. In the quantum key distribution system, however, there is no need for the transmitter to perform error correction decoding of a subset related to the forward error correction of final secure key data. That is, the transmitter can process a subset related to the forward error correction of final secure key data in high throughput. On the other hand, there is no need for the receiver to perform error correction decoding of a subset related to the backward error correction of final secure key data. That is, the receiver can process a subset related to the backward error correction of final secure key data in high throughput.

Figure 4:
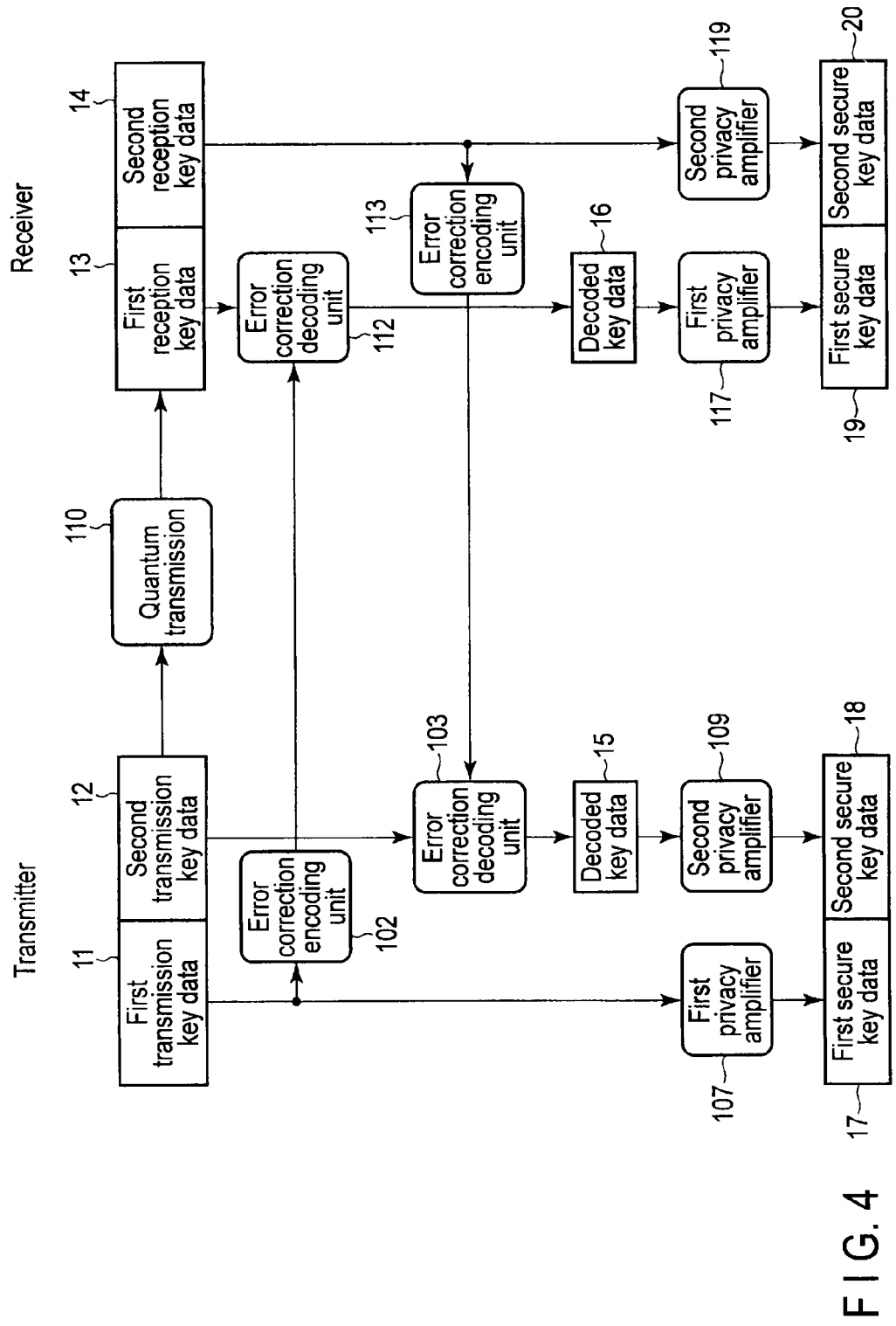
FIG. 4 is a block diagram showing a simplified quantum key distribution system in FIG. 1.

A simplified version of FIG. 1 is illustrated in FIG. 4. In the above quantum key distribution system according to Comparative Example 2, as shown in FIG. 3, the transmitter and receiver cannot perform privacy amplification before low-speed error correction decoding ends. On the other hand, in the quantum key distribution system, as shown in FIG. 4, the transmitter can access the first secure key data 17 at an early stage and the receiver can access the second key data 20 at an early stage. Therefore, the quantum key distribution system according to the present embodiment is suitable to, for example, remote data backup in which a subset of key data is used to encrypt application data at an early stage.

In the quantum key distribution system according to the present embodiment, the forward error correction and backward error correction are combined for application and separate privacy amplification is performed for each subset of key data. Therefore, according to the quantum key distribution system, information that may have been acquired by an eavesdropper of key data shared among normal parties can correctly be removed (that is, security is guaranteed). Further, in the quantum key distribution system, the transmitter and receiver can generate respective subsets of final secure key data in high throughput without waiting for low-speed error correction decoding by performing the separate privacy amplification and so can access the respective subsets at an early stage.

The processing in the above-described embodiments can be implemented using a general-purpose computer as basic hardware. A program implementing the processing in each of the above-described embodiments may be stored in a computer readable storage medium for provision. The program is stored in the storage medium as a file in an installable or executable format. The storage medium is a magnetic disk, an optical disc (CD-ROM, CD-R, DVD, or the like), a magnetooptic disc (MO or the like), a semiconductor memory, or the like. That is, the storage medium may be in any format provided that a program can be stored in the storage medium and that a computer can read the program from the storage medium. Furthermore, the program implementing the processing in each of the above-described embodiments may be stored on a computer (server) connected to a network such as the Internet so as to be downloaded into a computer (client) via the network.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A transmitter that transmits first transmission key data and second transmission key data as quantum information, comprising:
   an error correction encoding unit configured to generate first additional information by performing error correction encoding of the first transmission key data;
   an error correction decoding unit configured to generate decoded key data by correcting errors contained in the second transmission key data using second additional information generated based on second reception key data corresponding to the second transmission key data;
   a first privacy amplifier configured to generate first secure key data by performing privacy amplification on the first transmission key data to remove information that has possibly been acquired by an eavesdropper of the first transmission key data; and
   a second privacy amplifier configured to generate second secure key data by performing privacy amplification on the decoded key data to remove information that has possibly been acquired by an eavesdropper of the second reception key data.

2. A receiver that obtains first reception key data and second reception key data corresponding to first transmission key data and second transmission key data by receiving quantum information, comprising:
   an error correction encoding unit configured to generate second additional information by performing error correction encoding of the second reception key data;
   an error correction decoding unit configured to generate decoded key data by correcting errors contained in the first reception key data using first additional information generated based on the first transmission key data;
   a first privacy amplifier configured to generate first secure key data by performing privacy amplification on the decoded key data to remove information that has possibly been acquired by an eavesdropper of the first transmission key data; and
   a second privacy amplifier configured to generate second secure key data by performing privacy amplification on the second reception key data to remove information that has possibly been acquired by an eavesdropper of the second reception key data.

3. A quantum key distribution system, comprising:
   a transmitter that transmits first transmission key data and second transmission key data as quantum information; and
   a receiver that obtains first reception key data and second reception key data by receiving the quantum information, wherein the transmitter comprises
   a first error correction encoding unit configured to generate first additional information by performing error correction encoding of the first transmission key data,
   a first error correction decoding unit configured to generate first decoded key data by correcting errors contained in the second transmission key data using second additional information,
   a first privacy amplifier configured to generate first secure key data by performing privacy amplification on the first transmission key data to remove information that has possibly been acquired by an eavesdropper of the first transmission key data, and
   a second privacy amplifier configured to generate second secure key data by performing privacy amplification on the first decoded key data to remove information that has possibly been acquired by an eavesdropper of the second reception key data, the receiver comprises
   a second error correction encoding unit configured to generate the second additional information by performing error correction encoding of the second reception key data,
   a second error correction decoding unit configured to generate second decoded key data by correcting errors contained in the first reception key data using the first additional information,
   a third privacy amplifier configured to generate third secure key data by performing privacy amplification on the second decoded key data to remove information that has possibly been acquired by the eavesdropper of the first transmission key data, and
   a fourth privacy amplifier configured to generate fourth secure key data by performing privacy amplification on the second reception key data to remove information that has possibly been acquired by the eavesdropper of the second reception key data.

4. The system according to claim 3, wherein the transmitter and the receiver makes a remote data backup using the first secure key data, the second secure key data, the third secure key data, and the fourth secure key data.

5. A quantum key distribution method, comprising:
   transmitting, by a transmitter, first transmission key data and second transmission key data as quantum information;
   obtaining, by a receiver, first reception key data and second reception key data by receiving the quantum information;
   generating, by the transmitter, first additional information by performing error correction encoding of the first transmission key data;
   generating, by the transmitter, first decoded key data by correcting errors contained in the second transmission key data using second additional information;
   generating, by the transmitter, first secure key data by performing privacy amplification on the first transmission key data to remove information that has possibly been acquired by an eavesdropper of the first transmission key data;
   generating, by the transmitter, second secure key data by performing privacy amplification on the first decoded key data to remove information that has possibly been acquired by an eavesdropper of the second reception key data;

generating, by the receiver, the second additional information by performing error correction encoding of the second reception key data;
generating, by the receiver, second decoded key data by correcting errors contained in the first reception key data using the first additional information;
generating, by the receiver, third secure key data by performing privacy amplification on the second decoded key data to remove information that has possibly been acquired by the eavesdropper of the first transmission key data; and
generating, by the receiver, fourth secure key data by performing privacy amplification on the second reception key data to remove information that has possibly been acquired by the eavesdropper of the second reception key data.

* * * * *